(12) United States Patent
Lee et al.

(10) Patent No.: US 8,997,209 B2
(45) Date of Patent: Mar. 31, 2015

(54) MEMORY DEVICE COMPRISING A PLURALITY OF MEMORY CHIPS, AUTHENTICATION SYSTEM AND AUTHENTICATION METHOD THEREOF

(71) Applicant: Samsung Electronics Co., Ltd., Suwon-si, Gyeonggi-do (KR)

(72) Inventors: Won-Seok Lee, Suwon-si (KR); Young-Kug Moon, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 100 days.

(21) Appl. No.: 13/829,311

(22) Filed: Mar. 14, 2013

(65) Prior Publication Data

US 2013/0340068 A1     Dec. 19, 2013

(30) Foreign Application Priority Data

Jun. 13, 2012     (KR) .................. 10-2012-0063207

(51) Int. Cl.
  *G06F 21/00*     (2013.01)
  *G06F 21/44*     (2013.01)
  *G06F 21/70*     (2013.01)
(52) U.S. Cl.
  CPC ............... *G06F 21/44* (2013.01); *G06F 21/70* (2013.01)
  USPC ............... 726/16; 726/17; 726/18; 726/19; 726/20; 713/189; 713/190; 713/191; 713/192; 713/193

(58) Field of Classification Search
  CPC ........................................ G06F 21/70
  USPC .......................................... 726/16
  See application file for complete search history.

(56) References Cited

U.S. PATENT DOCUMENTS

| | | | |
|---|---|---|---|
| 8,140,843 B2 * | 3/2012 | Holtzman et al. | 713/157 |
| 8,516,265 B2 * | 8/2013 | Suzuki et al. | 713/186 |
| 2005/0033951 A1 | 2/2005 | Madter et al. | |
| 2005/0086497 A1 | 4/2005 | Nakayama | |
| 2006/0053308 A1 | 3/2006 | Zimmerman | |
| 2006/0265605 A1 | 11/2006 | Ramezani | |
| 2008/0086631 A1 | 4/2008 | Chow et al. | |
| 2008/0195830 A1 | 8/2008 | Lee et al. | |

FOREIGN PATENT DOCUMENTS

| | | |
|---|---|---|
| KR | 1020010098800 | 11/2001 |
| KR | 1020060090859 | 8/2006 |
| KR | 1020090097671 | 9/2009 |
| KR | 1020100097959 | 9/2010 |
| WO | 9819420 | 5/1998 |

* cited by examiner

*Primary Examiner* — Longbit Chai
(74) *Attorney, Agent, or Firm* — F. Chau & Associates, LLC

(57) ABSTRACT

A memory device includes a plurality of memory chips, including one or more memory chips that store authentication information, and a controller including a first register that stores information indicating a representative memory chip, from among the one or more memory chips that store the authentication information, that stores valid authentication information.

17 Claims, 14 Drawing Sheets

MEMORY DEVICE COMPRISING A PLURALITY OF MEMORY CHIPS, AUTHENTICATION SYSTEM AND AUTHENTICATION METHOD THEREOF

CROSS-REFERENCE TO RELATED APPLICATION

This application claims priority under 35 U.S.C. §119 to Korean Patent Application No. 10-2012-0063207, filed on Jun. 13, 2012, the disclosure of which is incorporated by reference herein in its entirety.

TECHNICAL FIELD

Exemplary embodiments of the present invention relate to a memory device including a plurality of memory chips, an authentication system and an authentication method thereof, and more particularly to effectively authenticating the memory device when some of a plurality of memory chips included in the memory device store authentication information.

DISCUSSION OF THE RELATED ART

As the use of portable electronic devices, such as mobile phones, personal digital assistants (PDAs), and digital cameras has been increasing, the use of flash memory as a storage media has also increased. Accordingly, in order to provide a variety of functions such as, for example, audio and video playback, there is an increasing demand for large capacity storage devices using flash memory.

SUMMARY

Exemplary embodiments of the present invention provide a memory device including a plurality of memory chips, which can be effectively authenticated using authentication information assigned to at least some of the plurality of memory chips included in the memory device, an authentication system and an authentication method thereof.

Exemplary embodiments of the present invention also provide a memory device including a plurality of memory chips, which can be effectively authenticated when authentication information assigned to at least some of the plurality of memory chips included in the memory device is unusable, an authentication system and an authentication method thereof.

Exemplary embodiments of the present invention also provide a memory device including a plurality of memory chips, which can adaptively block input and output operations of secure data for a memory chip having unusable authentication information, when authentication information assigned to at least some of the plurality of memory chips included in the memory device are unusable, an authentication system and an authentication method thereof.

According to an exemplary embodiment of the present invention, there is provided a memory device that includes a plurality of memory chips including one or more memory chips that store authentication information, and a controller including a first register that stores information concerning a representative memory chip that stores valid authentication information from among the one or more memory chips that store the authentication information.

According to an exemplary embodiment of the present invention, there is provided an authentication method of a memory device, the authentication method including providing a memory device including a plurality of memory chips including one or more memory chips that store authentication information, loading information concerning the representative memory chip, stored in the information retaining memory chip, to a register when power of the memory device is on, reading the authentication information stored in the representative memory chip indicated by the information stored in the register, and authenticating the memory device using the read authentication information. The representative memory chip is one of the memory chips that store the authentication information, and the information retaining memory chip is one of memory chips previously assigned among the plurality of memory chips.

According to exemplary embodiments of the present invention, the information concerning a memory chip that stores valid authentication information is stored in a register that is a high speed storage device, and if there is a request from a host device for the authentication information concerning the memory device, the memory device reads the authentication information from the memory chip indicated by the information stored in the register to then be provided to the host device. As a result, the time taken for searching for the memory chip that stores valid authentication information among the plurality of memory chips may be reduced.

According to exemplary embodiments of the present invention, even if authentication information is stored in only some of a plurality of memory chips included in the memory device, the memory device can be rapidly authenticated. As a result, the fabrication cost of the memory device may be reduced by reducing the cost of assigning authentication information for the memory chip.

According to exemplary embodiments of the present invention, in a case where the authentication information stored in some of a plurality of memory chips included in the memory device is to be subjected to revocation, since the information concerning the memory chip that stores the authentication information to be revoked is also stored in a high speed register. If there is a request for input and output operations of secure data, it is possible to rapidly identify whether the memory chip associated with the request stores the revoked authentication information without being authenticated by a host device.

According to an exemplary embodiment of the present invention, a memory device includes a plurality of memory chips, wherein one or more memory chips of the plurality of memory chips is configured to store authentication information, and a controller including a first register configured to store information indicating a representative memory chip from among the one or more memory chips configured to store the authentication information, wherein valid authentication information is stored in the representative memory chip.

According to an exemplary embodiment of the present invention, an authentication system includes a host device and a memory device. The host device includes an authentication unit configured to store a revoked authentication information list. The memory device includes a plurality of memory chips, wherein one or more memory chips of the plurality of memory chips is configured to store authentication information. The controller includes a first register configured to store information indicating at least one memory chip from among the one or more memory chips that stores valid authentication information, and a second register configured to store information indicating at least one memory chip from among the one or more memory chips that stores revoked authentication information. The at least one memory chip that stores the revoked authentication information is indicated by the revoked authentication information list.

According to an exemplary embodiment of the present invention, an authentication method of a memory device includes loading information indicating a representative memory chip into a register while the memory device is powered on, wherein the memory device comprises a plurality of memory chips, and one or more of the memory chips store authentication information, reading the authentication information stored in the representative memory chip indicated by the information stored in the register, and authenticating the memory device using the read authentication information, wherein the representative memory chip is one of the memory chips that store the authentication information, and the authentication information stored in the representative memory chip is valid authentication information.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
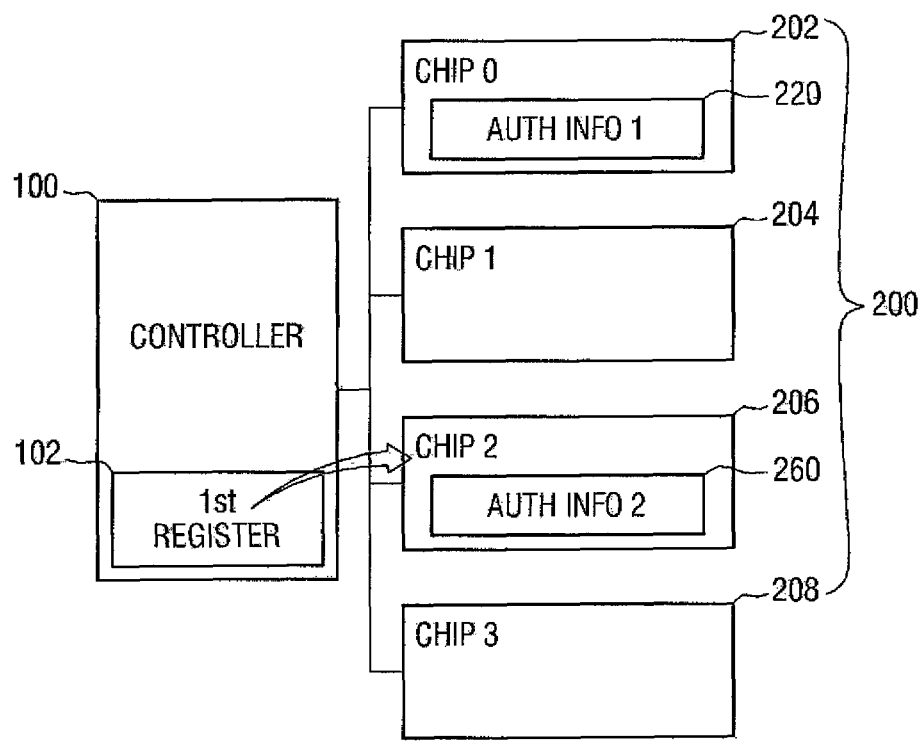
FIGS. 1 to 4 are block diagrams illustrating the configuration and operation of a memory device, according to exemplary embodiments of the present invention.

Exemplary embodiments of the present invention will be described more fully hereinafter with reference to the accompanying drawing. Like reference numerals may refer to like elements throughout the accompanying drawings.

Hereinafter, exemplary embodiments of the present invention will be described with regard to a memory device including a plurality of memory chips. The memory device according to exemplary embodiments of the present invention may include, for example, a controller that controls the plurality of memory chips, and transmits and receives signal(s) to and from a host device connected to the memory device.

Each of the plurality of memory chips may be, for example, a nonvolatile memory chip. The plurality of memory chips may be chips or packages that use, for example, NAND flash memory, NOR flash memory, phase change random access memory (PRAM), magnetic random access memory (MRAM), or resistive random access memory (RRAM) as storage means. However, the chips or packages are not limited thereto.

The memory device including the plurality of memory chips may be applied to, for example, a multimedia card (MMC), a secure digital (SD) card, a miniSD card, a microSD card, a memory stick, a SmartMedia Card, a TransFlash card, a memory card, a USB memory, or an embedded multimedia card (eMMC), however, application of the memory device is not limited thereto.

FIG. 1 is a block diagram illustrating the configuration and operation of a memory device, according to an exemplary embodiment of the present invention.

Referring to FIG. 1, the controller 100 and the plurality of memory chips 200 are integrated into a semiconductor device. In an exemplary embodiment, the controller 100 and the plurality of memory chips 200 may be integrated into a semiconductor device to form a memory card 10. The memory card 10 formed by the controller 100 and the plurality of memory chips 200 may be, for example, a personal computer memory card 10 international association (PCMCIA) card, a compact flash (CF) card, a SmartMedia Card (SM/SMC), a memory stick, a multimedia card (MMC), a reduced-size multimedia card (RS-MMC), an MMCmicro card, a secure digital (SD) card, a miniSD card, a microSD card, an SDHC, or a universal flash storage (UFS) card, however, the memory card 10 is not limited thereto.

The controller 100 and the nonvolatile memory chips 200 may be integrated into one semiconductor device to constitute a solid-state drive (SSD). When a memory system is used as a solid-state drive (SSD), an operation speed of the host connected to the memory system may be improved.

The plurality of memory chips 200 included in one memory device 10 may include nonvolatile memory chips of the same type or different types, and may have the same storage capacity or different storage capacities.

The plurality of memory chips 200 included in one memory device 10 are recognized as a single memory device by a host device using the memory device 10. As a result, the plurality of memory chips 200 may be driven using a single pile system through a single interface, and one storage device ID may be assigned to the memory device 10 from the viewpoint of a host device. For example, even if the memory device includes four memory chips, only one root address, e.g., F:\, may be assigned thereto. That is, the host device may not recognize that a plurality of memory chips 200 are included in the one memory device 10. For example, when the memory device 10 includes four memory chips, each having a storage capacity of 4 gigabytes (GB), the host device may recognize the memory device 10 as a single memory device 10 having a storage capacity of 16 GB.

The plurality of memory chips 200 included in one memory device 10 may be analyzed as physically individual nonvolatile memory chips or packages.

Figure 2:
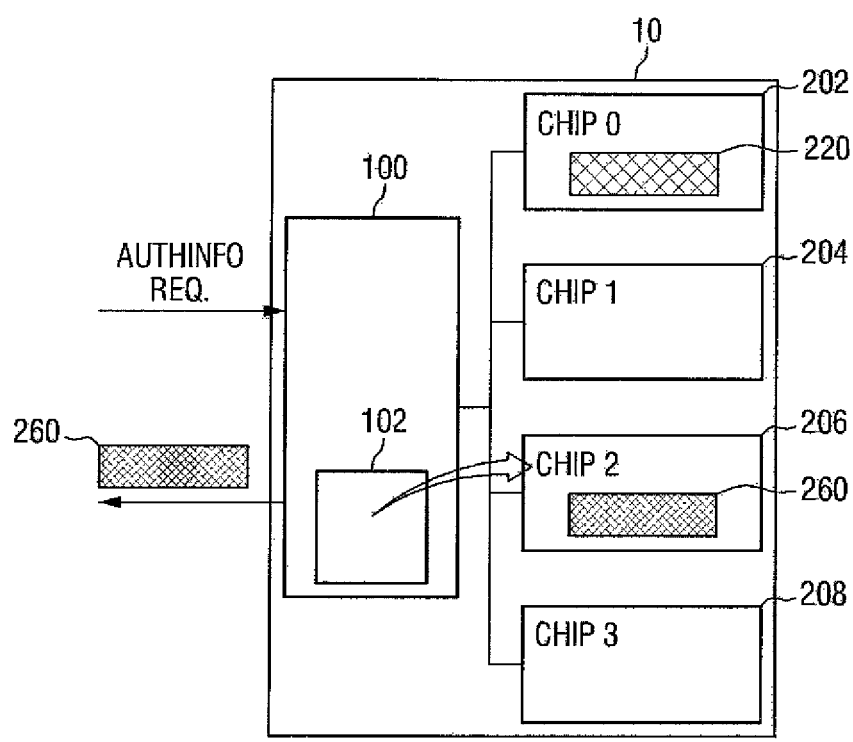
Figure 3:
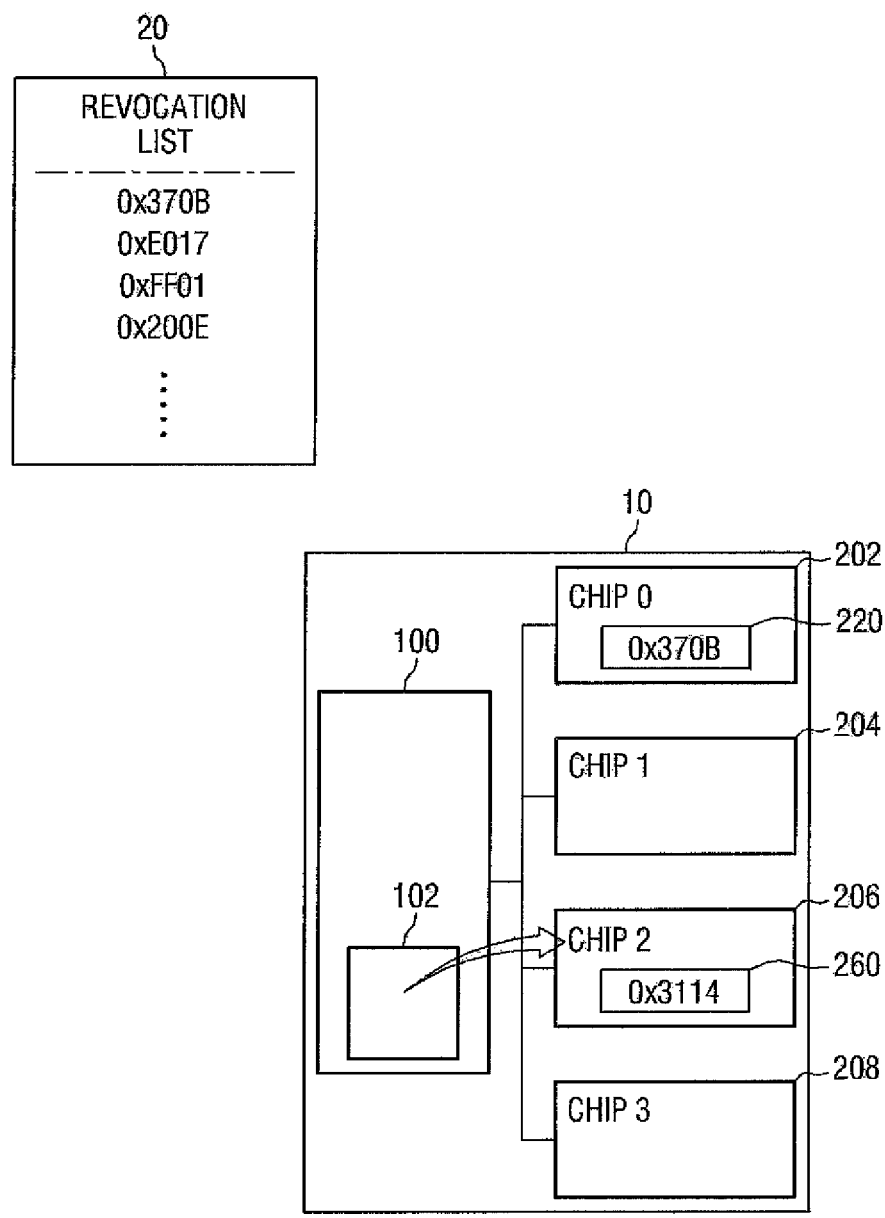

The configuration and operation of the memory device 10 according to an exemplary embodiment of the present invention will be further described with reference to FIGS. 1 to 3. FIGS. 1 to 3 illustrate the memory device 10 including 4 memory chips 202, 204, 206 and 208, however, the number of memory chips included in the memory device 10 is not limited thereto. For example, according to exemplary embodiments, the memory device 10 may include any number of memory chips greater than two.

As shown in FIG. 1, the memory device 10 according to an exemplary embodiment may include a controller 100 and a plurality of memory chips 200.

One or more of the plurality of memory chips 200 may be memory chips that store authentication information.

In an exemplary embodiment, all of the plurality of memory chips may be memory chips that respectively store authentication information. Alternatively, one or more of the plurality of memory chips may be memory chips that do not store authentication information. FIG. 1 shows that authentication information pieces (AUTH INFO 1 and AUTH INFO 2) 220 and 260 are respectively stored in only two memory chips (CHIP 0 and CHIP 2) 202 and 206 of four memory chips. According to an exemplary embodiment, when one or more of the plurality of memory chips included in the memory device 10 do not store the authentication information, the manufacturing cost of assigning the authentication information to memory chips during fabrication of the memory device 10 may be reduced.

In order to prevent the authentication information from being corrupted (e.g., unintentionally deleted, changed or leaked), the memory chip that stores the authentication information may store the authentication information in a system area. The system area may be logically or physically separated from a user area in which user data is stored.

As shown in FIG. 1, the controller 100 may include a first register 102, however, the number of registers included in the controller 100 is not limited thereto. For example, the controller 100 may further include a second register 104 in addition to the first register 102, as described with reference to FIG. 14. The first register 102 may be capable of storing data only in a state in which power is applied to the memory device 10. The first register 102 stores information indicating one memory chip of the plurality of memory chips 200 that stores valid authentication information. The one memory chip that stores the valid authentication information may be referred to as a representative memory chip.

The valid authentication information may refer to authentication information that is not included in an authentication information revocation list used in an authentication system for authenticating the memory device 10, and the memory device 10 may be authenticated using the valid authentication information.

The validity of authentication information will now be described with reference to FIG. 3.

FIG. 3 shows a revocation list 20 of the authentication information. The revocation list 20 is a list of pieces of authentication information determined as being corrupt. For example, the pieces of authentication information may be corrupt as a result of being unintentionally deleted, changed, or leaked (e.g., as the result of hacking). The revocation list 20 may be generated by an authentication server that manages the authentication system of the memory device 10 to then be distributed to a host device that authenticates the memory device 10.

The information stored in the first register 102 may be information indicating the representative memory chip. The information stored in the first register 102 may be information analyzed by the controller 100 to identify which one among the memory chips is the representative memory chip, however, the information stored in the first register is not limited thereto.

For example, when the controller 100 identifies the representative memory chip by sequentially assigning offsets 0, 1, 2 and 3 to the plurality of memory chips 202, 204, 206 and 208, the data stored in the first register 102 may include an offset of the representative memory chip. For example, as shown in FIG. 1, an offset 0 may be assigned to the memory chip 202, an offset 1 may be assigned to the memory chip 204, an offset 2 may be assigned to the memory chip 206, and an offset 3 may be assigned to the memory chip 208. If the memory chip 206 is the representative memory chip, an offset 2 of the memory chip 206 may be stored in the first register 102.

As shown in FIG. 3, the memory device 10 may include memory chips that store valid authentication information and memory chips that store revoked authentication information included in the revocation list 20.

The authentication information pieces 220 and 260 respectively stored in the memory chips 202 and 206 may correspond to information used to identify or authenticate the memory chips 202 and 206. For example, the authentication information pieces 220 and 260 may be unique IDs of the memory chips 202 and 206 storing the authentication information pieces 220 and 260, which are described in more detail with reference to FIG. 4. The authentication information pieces 220 and 260 stored in the memory chips 202 and 206, and particularly the authentication information 260 stored in the representative memory chip 202, may be used as the information for authenticating the memory device 10.

Referring back to FIG. 1, since the memory device 10 includes the controller 100 including the first register 102 that stores the information indicating the representative memory chip 206, the representative memory chip may be quickly identified without having to individually check each memory chip to determine which chip is the representative memory chip, check whether the authentication information is stored in each memory chip, or check whether the authentication information stored in the memory chip is valid.

FIG. 2 illustrates the operation of the memory device 10, according to an exemplary embodiment of the present invention, in response to an input request signal that requests authentication information for authenticating the memory device 10. In FIG. 2, the input request signal is referred to as AUTH INFO REQ.

The controller 100 included in the memory device 10 may input an authentication information read command (ID REQ CMD) to the memory chip 206 indicated by the information stored in the first register 102 in response to the input request signal, and may output the authentication information 260 provided from the representative memory chip 206.

In response to the input request signal for providing the memory device authentication information, the memory device 10 may directly read the authentication information 260 stored in the representative memory chip 206 by indexing the information stored in the first register 102, and may output the read authentication information.

As described above, according to exemplary embodiments of the present invention, each of the plurality of memory chips 202, 204, 206 and 208 in the memory device 10 are not searched for valid authentication information in response to the input request signal. As a result, authentication speed may be increased.

If two or more memory chips store authentication information, the memory chips that store the authentication information may store different types of authentication information. For example, a first memory chip among the memory chips that store the authentication information may store first authentication information, and a second memory chip among the memory chips that store the authentication information may store second authentication information different from the first authentication information. This is illustrated in FIG. 2 by the different patterns used to represent the authentication information 220 (AUTH INFO 1) stored in the memory chip 202 (CHIP 0), and the authentication information 260 (AUTH INFO 2) stored in the memory chip 206 (CHIP 2).

An example of the operation of the memory device 10 will now be described with reference to FIG. 4. In the example, the authentication information stored in a memory chip is a unique ID of the memory chip.

In order to prevent the unique ID of the memory chip from being corrupted (e.g., leaked), the memory chip may store the unique ID in a system area that is accessible by a read only memory. For example, the unique ID may be programmed by a manufacturer at the time of manufacturing the memory chip, and the authentication information may be prohibited from being subsequently modified (e.g., changed or deleted). That is, according to an exemplary embodiment, the authentication information cannot be changed or deleted subsequent to the authentication information being initially programmed.

Figure 4:
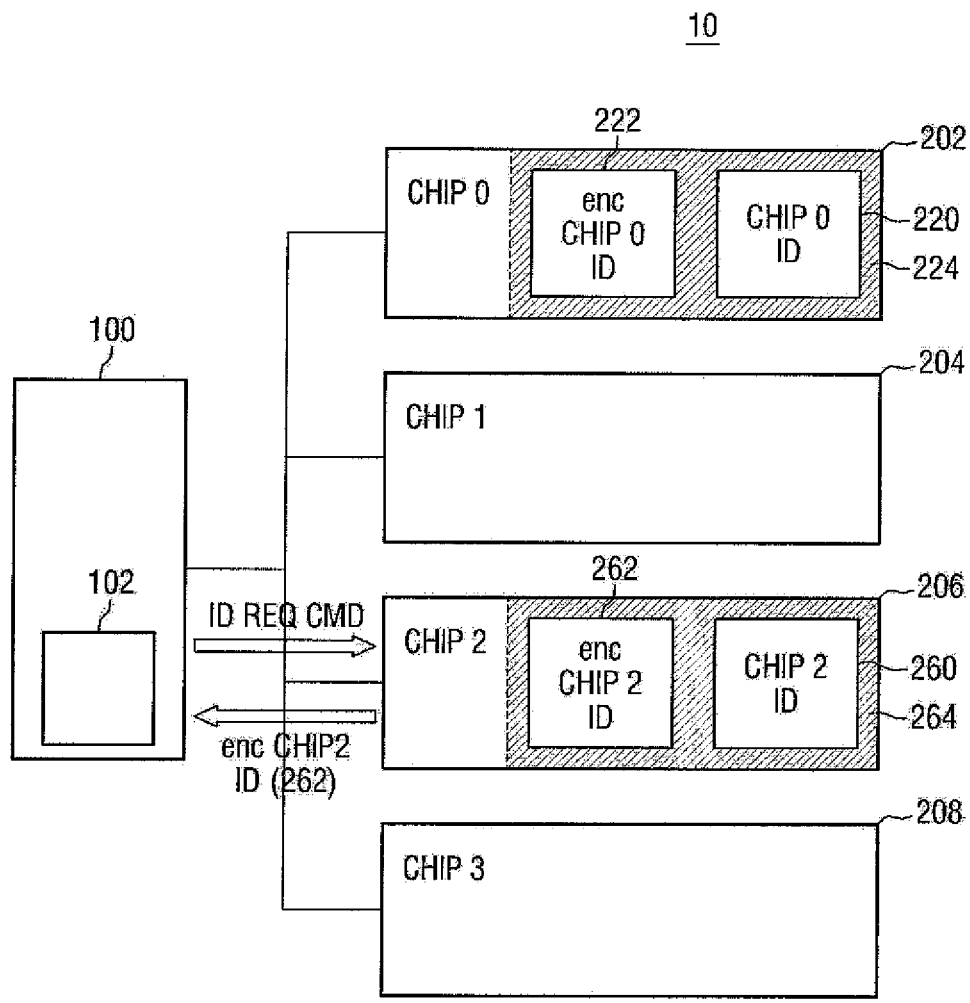

Referring to FIG. 4, a chip 0 ID 220 of the memory chip 202 (CHIP 0) is stored in a system area 224, and a chip 2 ID 260 of the memory chip 206 (CHIP 2) is stored in a system area 264. The system areas 224 and 264 may be read only accessible areas.

According to an exemplary embodiment, the unique ID output by the memory chip to the controller 100 may be encrypted. In this case, the memory chip does not output an unencrypted version of the unique ID to the controller 100. That is, according to an exemplary embodiment, the unique ID may be output to the controller 100 only in an encrypted state. Thus, the memory chip may store the encrypted unique ID separately from the unique ID. For example, referring to FIG. 4, an encrypted unique ID 222 may be separately stored from the unencrypted unique ID 220 in a first region of the memory chip 202, and an encrypted unique ID 262 may be separately stored from the unencrypted unique ID 260 in a second region of the memory chip 206. The encrypted unique IDs 222 and 262 may also be stored in the system areas 224 and 264.

For example, the memory chip 206 may receive an authentication information read command (ID REQ CMD) from the controller 100, and may output the encrypted unique ID 262 of the memory chip 202, rather than the unencrypted unique ID 260 of the memory chip 202, to the controller 100, as shown in FIG. 4.

A connection mechanism between the controller 100 and the plurality of memory chips 202, 204, 206 and 208 in the memory device 10, according to an exemplary embodiment of the present invention, will be described with reference to FIG. 5.

Figure 5:
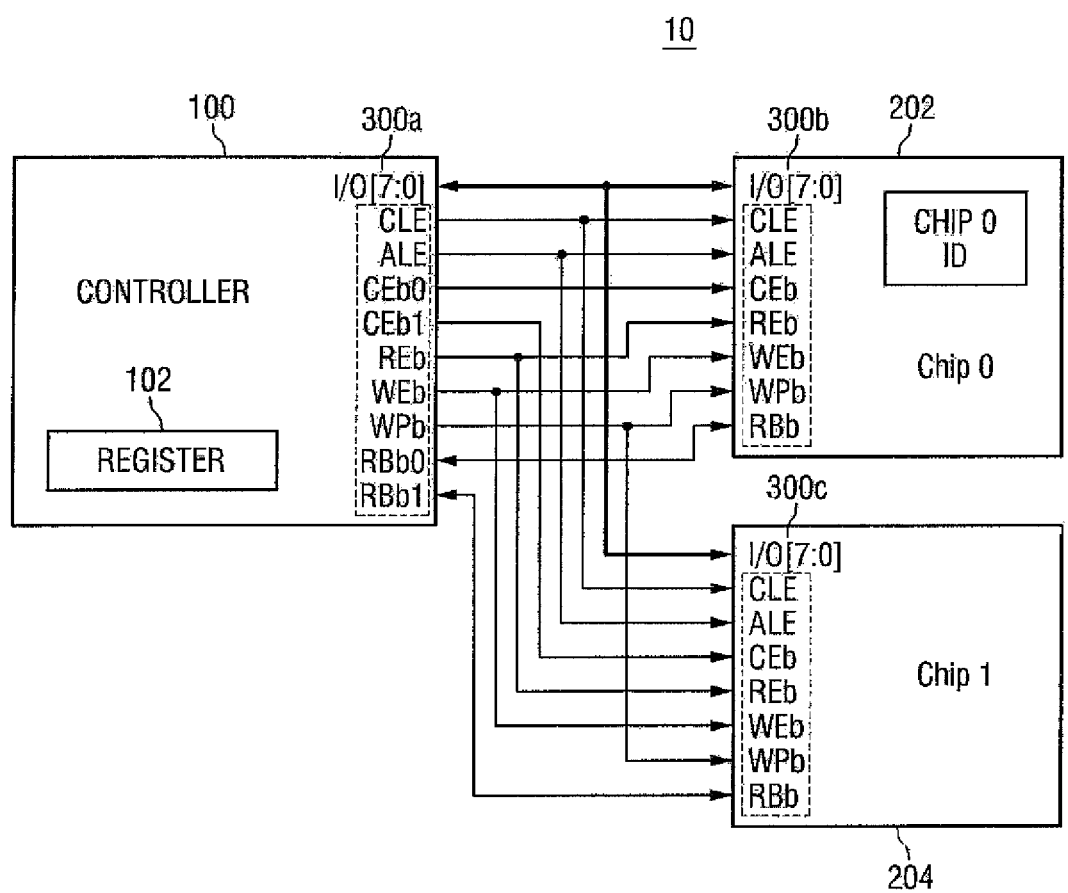
FIG. 5 is a diagram illustrating a pin connection between a controller and a plurality of memory chips in the memory device, according to an exemplary embodiment of the present invention.

As shown in FIG. 5, the controller 100 includes a plurality of input/output (I/O) pins 300a for transmitting and receiving data and control signals to and from the memory chips 202 and 204. The plurality of pins 300a may include, for example, command latch pins (CLE), address latch pins (ALE), and chip enable pins CEb0, CEb1, etc., used for the control signals.

The plurality of memory chips included in the memory device 10 transmits and receives data to and from the controller 100 via I/O pins (e.g., 300b, 300c) corresponding to the I/O pins 300a of the controller 100. Thus, the controller 100 and the memory chips may include the same number of chip enable pins CEb0 and CEb1.

For example, the chip enable pins CEb0 and CEb1, and pins excluding RBb0 and RBb1 respectively indicating memory chip states, may be commonly connected between the memory chips 202 and 204.

Figure 6:
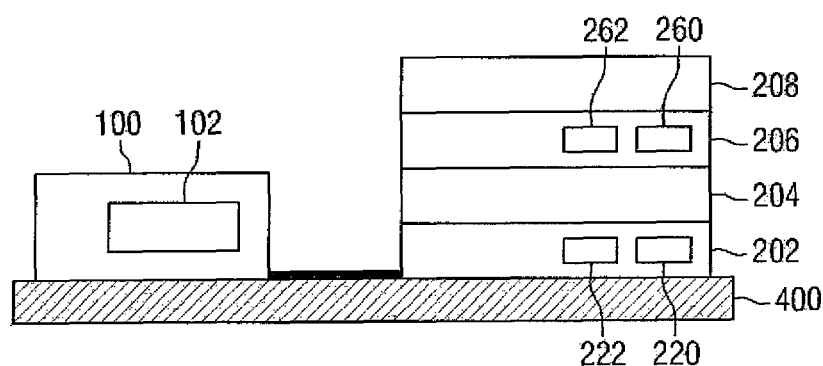
FIG. 6 illustrates a stacked structure of a plurality of memory chips illustrating the configuration and operation of a memory device, according to an exemplary embodiment of the present invention.

FIG. 6 shows a configuration of the memory device 10, according to an exemplary embodiment of the present invention. As shown in FIG. 6, the controller 100 and the plurality of memory chips 202, 204, 206 and 208 may be disposed on a substrate 400. The controller 100 may include a first register 102, and some memory chips (e.g., memory chips 202 and 206) of the plurality of memory chips 202, 204, 206 and 208 may store the unique unencrypted IDs 220 and 260 and the encrypted IDs 222 and 262, as described above.

A large capacity flash memory device may be configured such that a plurality of low capacity flash memory chips are assembled into a package using multi-chip packaging technology. When unique keys used for memory authentication are stored in each of the respective low capacity flash memory chips, a plurality of keys are stored in one large capacity flash memory device. Storing the unique keys in all of the memory chips in the device may increase the manufacturing cost. Further, if some of the unique keys become unusable, problems relating to the authentication of the large capacity flash memory device may occur. According to exemplary embodiments of the present invention, unique keys used for memory authentication may be stored in less than all of the memory chips in a memory device, which may decrease the search time relating to finding valid authentication information among the plurality of memory chips, as well as decreasing the manufacturing cost of the memory device.

Hereinafter, according to an exemplary embodiment of the present invention, a memory device 10 that operates such that the information for authenticating the memory device 10 is provided to the host device using the information stored in the first register 102, and the information stored in the first register 102 is managed, will be described with reference to FIGS. 7 to 13.

In an exemplary embodiment according to FIGS. 7 to 13, the authentication information stored in the memory chip is a unique ID of the memory chip.

The memory device 10 according to an exemplary embodiment of the present invention may be connected to the host device, and the controller 100 may transmit and receive signals to and from the host device. If the controller 100 receives a command associated with authentication from the host device, the controller 100 outputs the authentication information read command (ID REQ CMD) to the memory chip indicated by the information stored in the first register 102, and provides the authentication information received from the memory chip to the host device.

Figure 7:
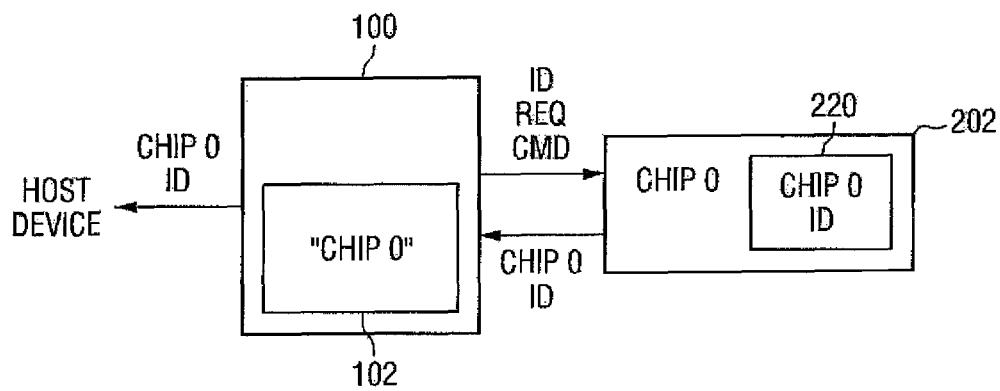
FIGS. 7 to 13 illustrate signal transmission and reception between components of the memory device, according to an exemplary embodiment of the present invention.

Referring first to FIG. 7, since the information indicating the memory chip 202 is stored in the first register 102, the controller 100 inputs the authentication information read command (ID REQ CMD) to the memory chip 202 in response to the input authentication information request signal from the host device. The memory chip 202 outputs the chip 0 ID 220 stored therein to the controller 100. The controller 100 outputs the chip 0 ID 220 to the host device.

Figure 8:
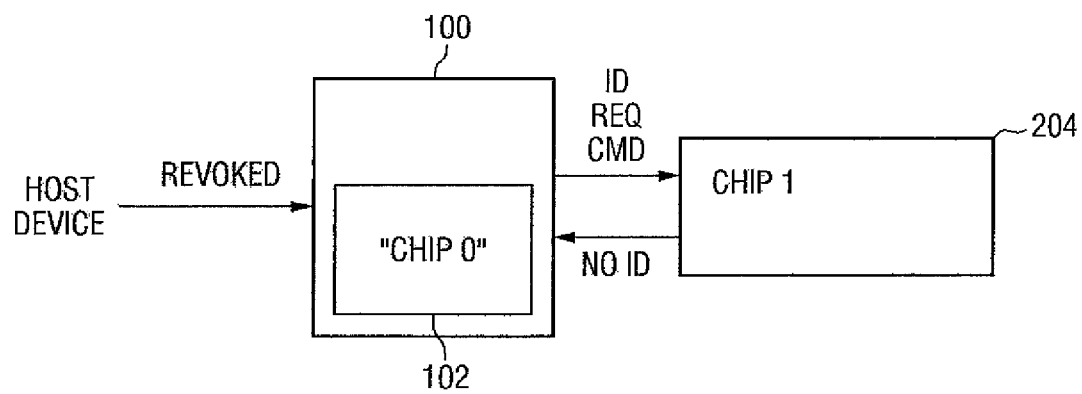

Referring to FIG. 8, the host device may output a response signal indicating that the chip 0 ID 220 is revoked to the controller 100. If the host device has attempted to authenticate the memory device 10 using the chip 0 ID 220, but failed to authenticate the memory device, the response signal may be input to the controller 100. For example, when the memory chip 0 ID 220 is included in the revocation list, the host device may fail authenticating the memory device.

Since the memory device 10 is not further authenticated using the ID of the representative memory chip, the controller 100 provides an ID of the memory chip other than the representative memory chip to the host device for achieving successful authentication. In addition, the information stored in the first register 102 is updated to the information indicating the new representative memory chip.

For example, if a response indicating that the authentication information provided to the host device is revoked is received from the host device, the controller 100 may request that the host device determine whether the ID of a memory chip other than the memory chip that stores the revoked authentication information among the memory chips that store IDs is valid. This allows for the determination of a new representative memory chip that stores the valid ID, and information indicating the new representative memory chip may then be stored in the first register 102.

In order to search for a new representative memory chip that stores the valid ID, the controller 100 may output an authentication information read command to the memory chip (e.g., memory chip 204 (CHIP 1)) subsequent to the existing representative memory chip (e.g., memory chip 202 (CHIP 0)). In this case, since the memory chip 204 (CHIP 1) does not store an ID, a response is issued indicating that no ID exists.

As shown in FIG. 8, when the response indicating that the authentication information provided to the host device is revoked is received from the host device, the memory device 10 may disapprove the request associated with input/output operation of secure data from the host device according to secure data blocking policies.

The secure data is different from user data. For example, recording, deleting and/or changing the user data is performed by a user's command, while recording, deleting and/or changing the secure data is performed by a security program instead of a user's command. The secure data may be stored in the system area, which is not accessible to the user, or may be recorded in the format of a non-readable file.

According to one of the secure data blocking policies according to an exemplary embodiment, the memory device 10 may disapprove a request associated with the input or output of secure data for all of the plurality of memory chips 202, 204, 206 and 208 when any one of the plurality of memory chips 202, 204, 206 and 208 included in the memory device 10 stores revoked authentication information. For example, if the response indicating that the authentication information provided to the host device is revoked is received from the host device, the controller 100 of the memory device 10 may not perform the input or output control operation of the secure data for all of the plurality of memory chips 202, 204, 206 and 208. In this case, the controller 100 may provide a notification to the host device indicating that the authentication information indicates a defective memory device.

According to one of the secure data blocking policies according to an exemplary embodiment, the memory device 10 may perform the input or output operation of secure data for all of the plurality of memory chips 202, 204, 206 and 208 when any one of the plurality of memory chips 202, 204, 206 and 208 included in the memory device 10 stores valid authentication information. For example, the memory device 10 may only block the input or output operation of the secure data when there is not a memory chip from among the plurality of memory chips 202, 204, 206 and 208 included in the memory device 10 that stores valid authentication information.

According to one of the secure data blocking policies according to an exemplary embodiment, the memory device 10 may disapprove the request associated with the input or output operation of secure data only for the memory chip that stores the revoked authentication information among the plurality of memory chips 202, 204, 206 and 208 included in the memory device 10. That is, the memory device 10 may activate the input or output operation of secure data differently for each memory chip. For example, the secure data input or output operation of only the memory chip that does not store authentication information, or that stores revoked authentication information, may be deactivated.

Figure 14:
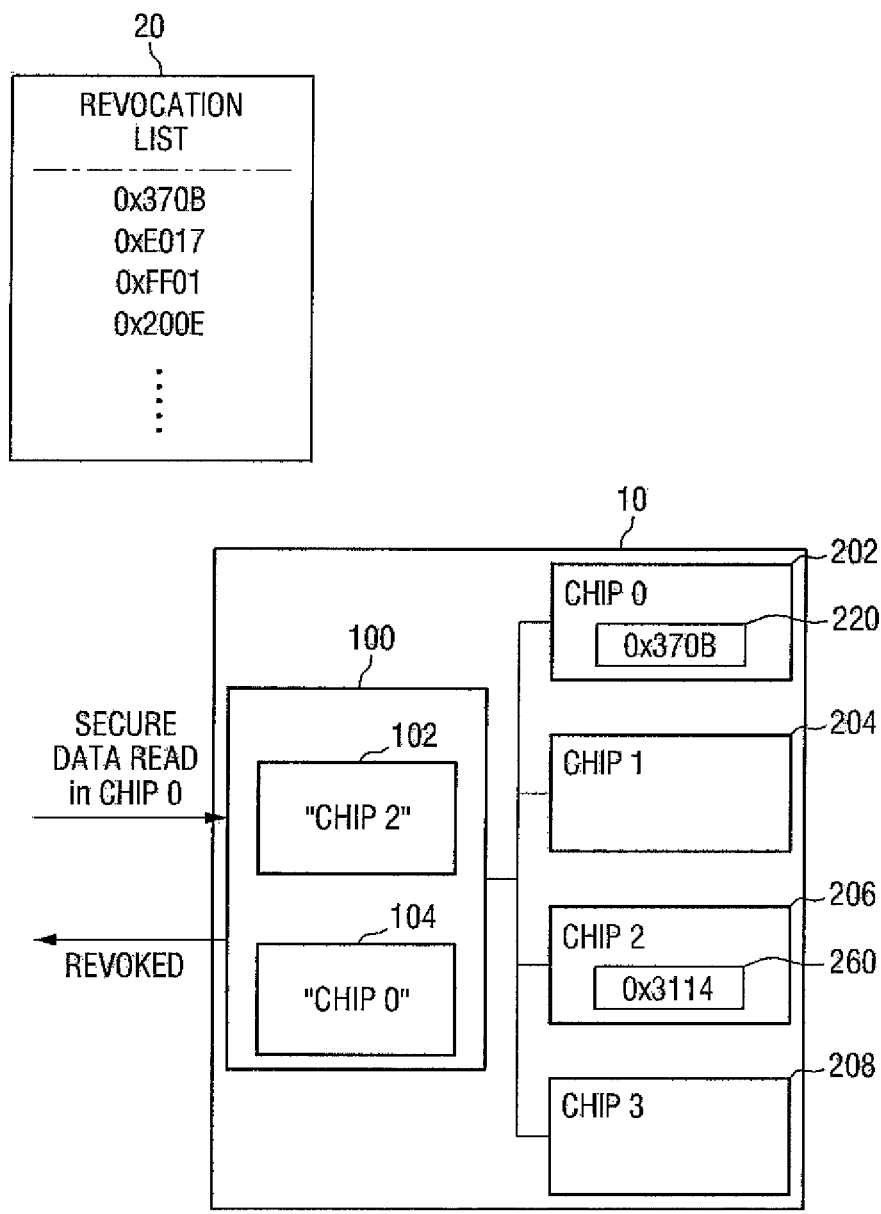
FIG. 14 is a block diagram illustrating the configuration and operation of a memory device, according to an exemplary embodiment of the present invention.

According to the secure data blocking policy in which the secure data input or output operation is activated differently for each memory chip, the controller 100 may further include a second register 104 that stores information indicating the revoked memory chip that stores the revoked authentication information, as shown in FIG. 14. The utilization of the second register 104, and the corresponding information stored in the second register 104, may increase the speed at which the controller 100 identifies the memory chip that stores the revoked authentication information. If there is a request associated with the input or output operation of secure data for the memory chip indicated by the information stored in the second register 104, the controller 100 may deny the request.

Figure 9:
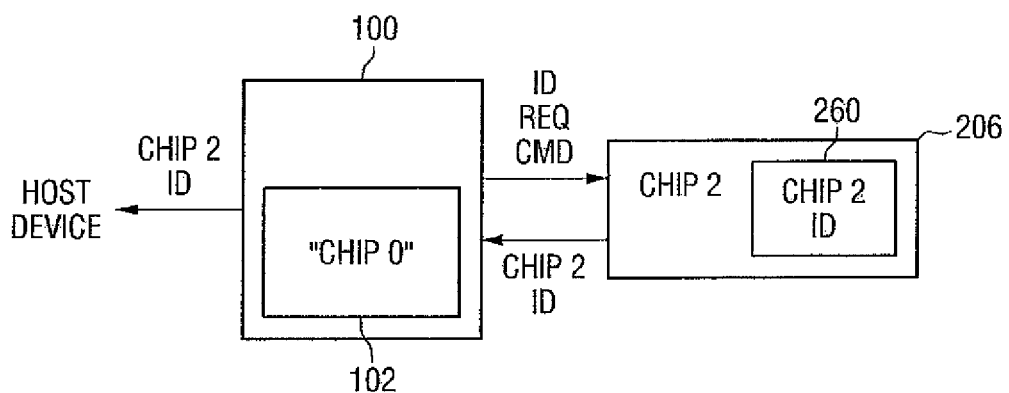

Referring to FIG. 9, the controller 100 inputs an authentication information read command (ID REQ CMD) to the memory chip 206, and receives the chip 2 ID 260 from the memory chip 206 in response to the input authentication information read command (ID REQ CMD). The controller 100 provides the received chip 2 ID 260 to the host device.

The controller 100 may store the information indicating the memory chip which has provided the memory chip ID (e.g., chip 2 ID 260) to the first register 102 as soon as the memory chip ID is provided from the memory chip 206. When the host device is successfully authenticated, a separate notification may or may not be provided.

In this case, at the time when the controller 100 receives the memory chip ID, the information indicating the memory chip having the memory chip ID may be stored, regardless of whether authentication using the memory chip ID has been successfully performed.

Figure 10:
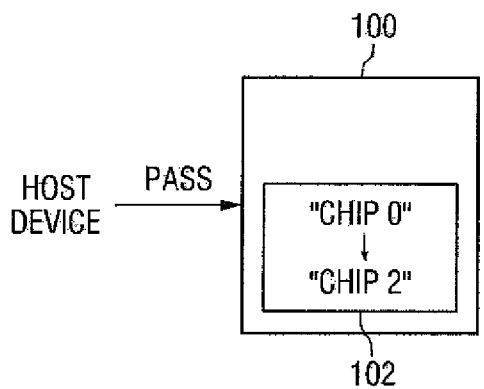

FIG. 10 shows the controller 100 recording the information indicating the memory chip 206 having provided a memory chip ID used in authentication in the first register 102 when a signal notifying successful authentication (e.g., a pass signal), is received from the host device. That is, the information indicating the memory chip may be stored in the first register 102 when the pass signal is received from the host device.

Figure 11:
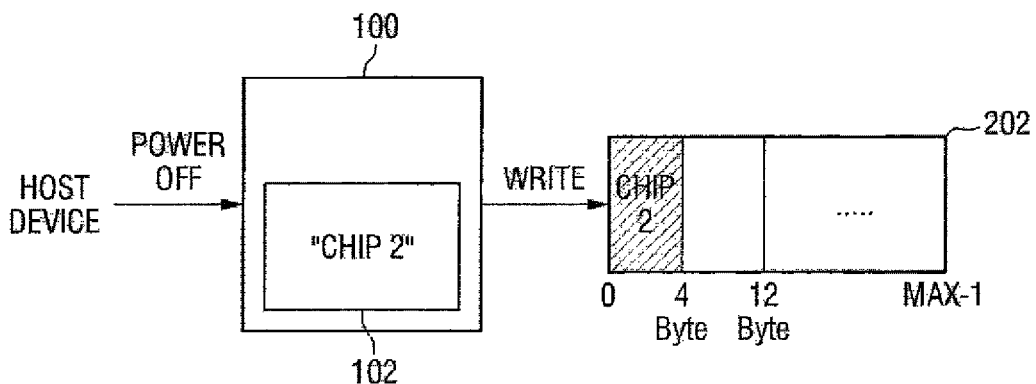

FIG. 11 illustrates the operation of the controller 100, according to an exemplary embodiment, when power of the memory device 10 is off. Since the first register 102 may only be able to store information when the power of the memory device 10 is on, the information stored in the first register 102 may be lost when the power of the memory device 10 is off. Therefore, to prevent the information stored in the first register 102 from being lost, the controller 100 may store the information stored in the first register 102 in a backup memory area when a power-off notification signal is received from the host device.

The backup memory area may be included in one of the plurality of memory chips of the memory device 10. For example, in FIG. 11, memory chip 202 includes the backup memory area. In addition, the controller 100 may store the information stored in the first register 102 in a previously assigned address area of the backup memory area. FIG. 11 illustrates that a 4 byte backup area of data stored in the first register 102 is assigned to a 0-to-4 byte area in the backup memory area of the memory chip 202.

Figure 12:
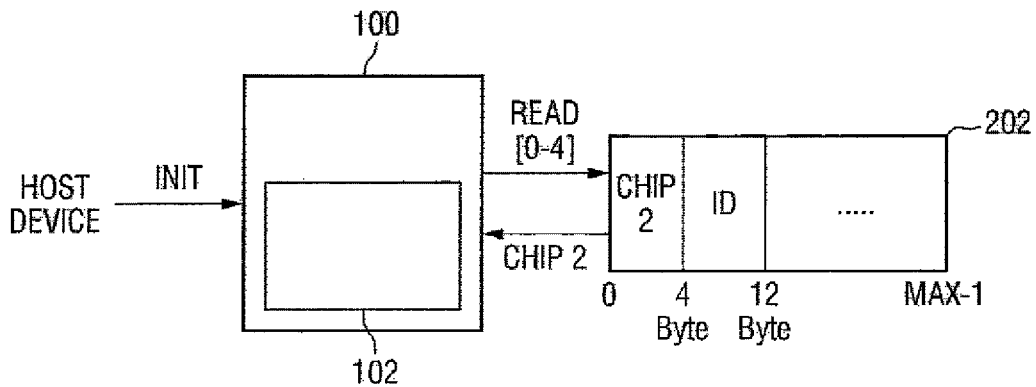
Figure 13:
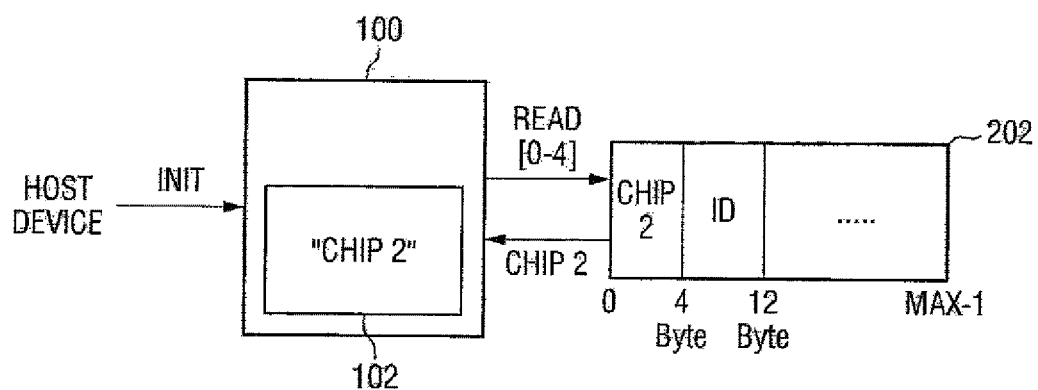

FIG. 12 illustrates the operation of the controller 100, according to an exemplary embodiment, when power of the memory device 10 turns on. The first register 102 does not store any data at the time of power on. The controller 100 loads the information indicating a representative memory chip from the backup memory area to the first register 102, in response to receiving an initializing signal from the host device. As a result, the memory device 10 which has finished initializing process stores the information indicating the representative memory chip, as depicted in FIG. 13. Therefore, the memory device 10 which has finished initializing process, is able to provide the authentication information of the representative memory chip, in response to the memory device authentication information request, immediately.

The host device is connected to the controller 100 through a bus and provides a control signal to the controller 100 to allow the controller 100 to control operations of the memory device 10. The host device may be a processing system used in, for example, a cellular phone, a bidirectional radio communication system, a one-way pager, a two-way pager, a personal communication system, a portable computer, a personal information manager, an audio and/or video player, a digital and/or video camera, a navigation system, a GPS, etc., however the host device is not limited thereto.

The host device requests that the memory device 10 provide authentication information, and authenticates the memory device 10 using the authentication information provided by the memory device 10.

Figure 15:
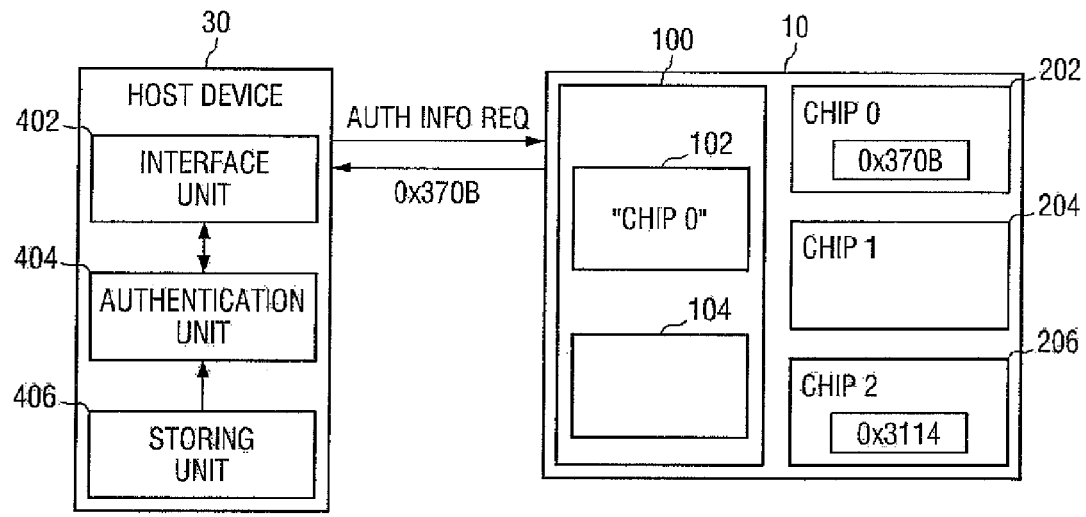
FIGS. 15 to 17 are block diagrams illustrating the configuration and operation of an authentication system, according to an exemplary embodiment of the present invention.
Figure 16:
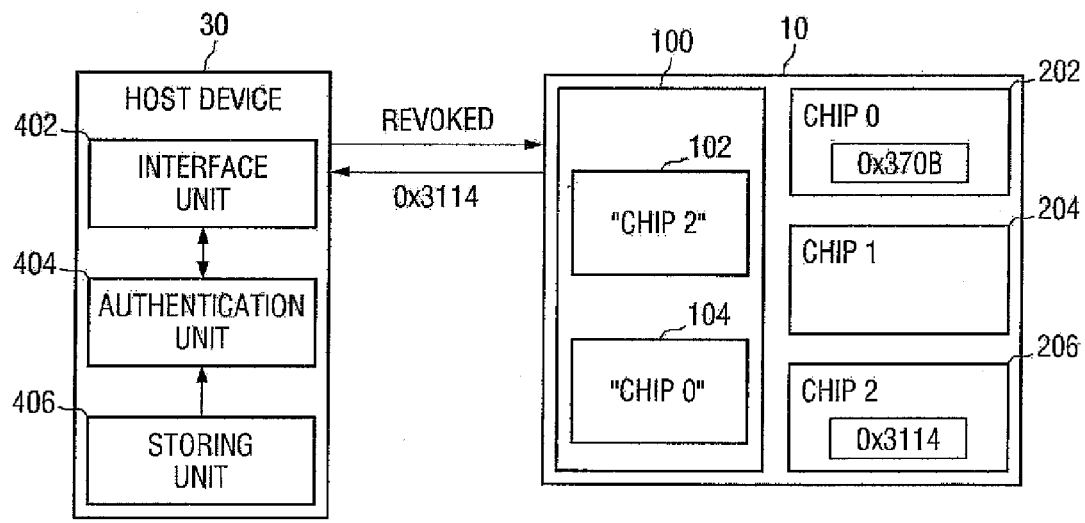
Figure 17:
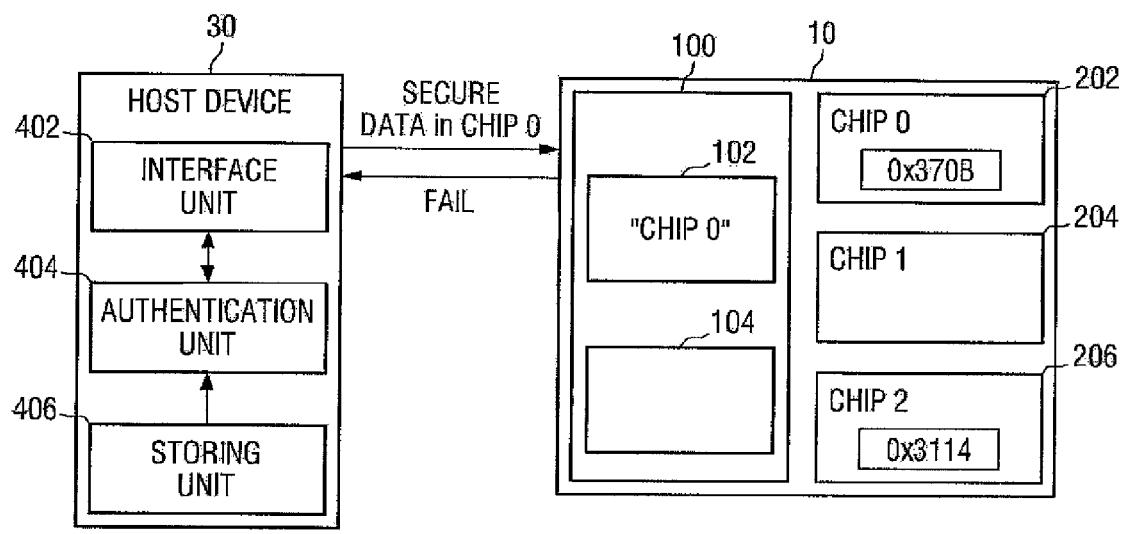

As shown in FIGS. 15-17, the host device 30 may include an interface unit 402 that permits data transmission/reception between the host device 30 and the memory device 10, an authentication unit 404 that authenticates a memory device using the authentication information provided from the memory device 10 through the interface unit 402, and a storing unit 406 that stores the revoked authentication information list used as basic data of the authentication unit 404 authenticating the memory device.

The memory device 10 may include a plurality of memory chips 202, 204 and 206, and a first register 102. The memory device 10 reads the authentication information stored in a representative memory chip indicated by the information stored in the first register 102 in response to the request from the host device 30, and provides the read authentication information to the host device 30. The memory device 10 may include a controller 100 controlling the plurality of memory chips 202, 204 and 206, and the first register 102 may be provided in the controller 100.

As shown in FIG. 15, if the host device 30 requests the memory device 10 to provide authentication information for authenticating the memory device 10, the memory device 10 may immediately identify the representative memory chip that stores valid authentication information by indexing the first register 102, and the authentication information stored in the representative memory chip may then be provided to the host device 30. In FIG. 15, the memory chip 202 (CHIP 0) is assigned as the representative memory chip, and the memory device 10 provides the authentication information 0×370B stored in the memory chip 202 to the host device 30.

The host device 30 attempts to authenticate the memory device 10 using 0×370B. For example, the authentication unit 404 determines whether 0×370B is included in the revocation list stored in the storing unit 406. If 0×370B is included in the revocation list, it may be determined that the host device 30 has failed in authentication. If 0×370B is not included in the revocation list, it may be determined that the host device 30 has succeeded in authentication.

FIG. 16 illustrates signals or data transmitted or received between the host device 30 and the memory device 10 when 0×370B is included in the revocation list. As shown in FIG. 16, the host device 30 provides the memory device 10 with a revocation notification signal notifying that the authentication information provided from the memory device 10 is revoked.

In response to the revocation notification signal, the memory device 10 provides the host device with the authentication information stored in the memory chips 204 and 206 among the plurality of memory chips 202, 204, 206 included in the memory device 10 to identify valid authentication information. Since the authentication information is not stored in the memory chip 204, the memory device 10 provides the host device 30 with the authentication information 0×3114 stored in the memory chip 206.

The memory device 10 stores the information stored in the first register 102 in the second register 104 in response to the revocation notification signal. That is, the information indicating the memory chip that stores the revoked authentication information is stored in the second register 104.

The memory device 10 may store the information indicating the memory chip that stores the authentication information in the first register 102 when the authentication information is provided to the host device 30. Therefore, even if a notification regarding the validity of 0×3114 has not been received from the host device 30, the information indicating the memory chip 206 that stores 0×3114 may be stored in the first register 102, as shown in FIG. 16.

Referring to FIG. 17, if there is a secure data read request for the memory chip that stores the revoked authentication information, the memory device authentication system according to an exemplary embodiment of the present invention operates in the following manner. In this example, the memory device 10 operates under the secure data blocking policies in which a request for an input or output operation of secure data for the memory chip that stores the revoked authentication information is not made.

If the memory device 10 receives a read request of secure data stored in the memory chip 202 from the host device 30, the memory device 10 determines whether the information indicating the memory chip 202 is stored in the second register 104. That is, if there is a request associated with the input or output of secure data, the memory device 10 determines whether the memory chip that stores the secure data is a memory chip that stores the revoked authentication information. If the memory chip that stores the secure data is a memory chip that stores the revoked authentication information, the memory device 10 does not proceed with the request from the host device 30 associated with the secure data, and rather, transmits a revocation notification signal of the authentication information to the host device 30.

Figure 18:
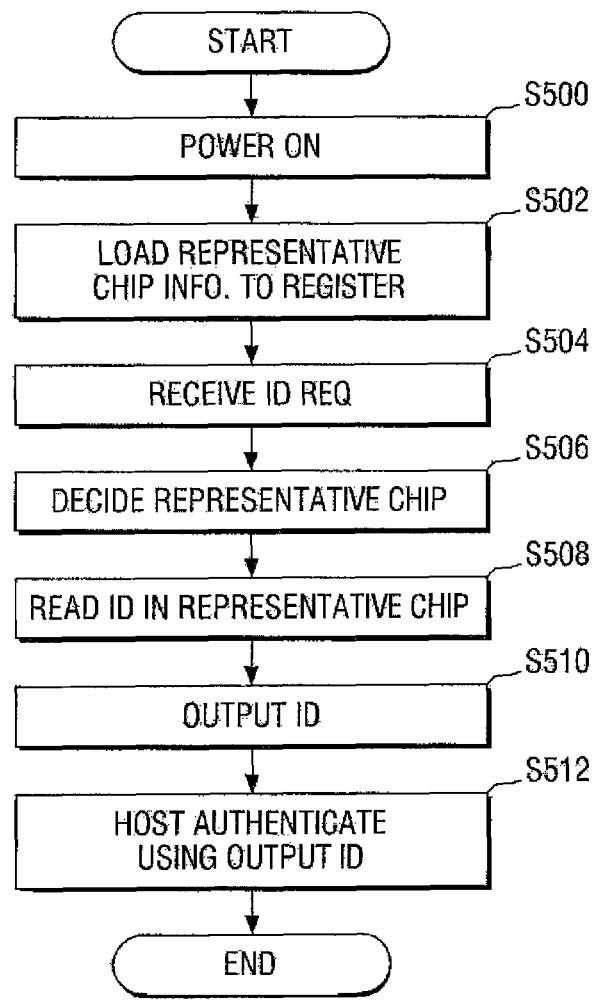
FIGS. 18 and 19 are flowcharts showing an authentication method of a memory device, according to an exemplary embodiment of the present invention.

An authentication method of a memory device, according to an exemplary embodiment of the present invention, will be described with reference to FIG. 18.

The memory device includes at least one memory chip that stores authentication information, and a register that stores information indicating the memory chip.

When power of the memory device is on (S500), the information indicating a representative memory chip, which is stored in a memory chip from among the plurality of memory chips that includes an information retaining memory area, is loaded into the register (S502). The loading may be an operation included in an initializing process immediately performed when the power of the memory device is turned on.

When the initialization of the memory device is completed, an authentication information request signal (ID REQ) for authenticating the memory device is received from the host device connected to the memory device (S504).

Based on the information stored in the register, it is determined which one among the plurality of memory chips included in the memory device is a representative memory chip (S506). The authentication information read command is input to the representative memory chip to read the authentication information stored in the representative memory chip (S508). The memory device outputs the read authentication information as authentication information for its own authentication (S510).

The host device authenticates the memory device using the output authentication information (S512).

An authentication method of a memory device, according to an exemplary embodiment of the present invention, will be described with reference to FIG. 19.

Figure 19:
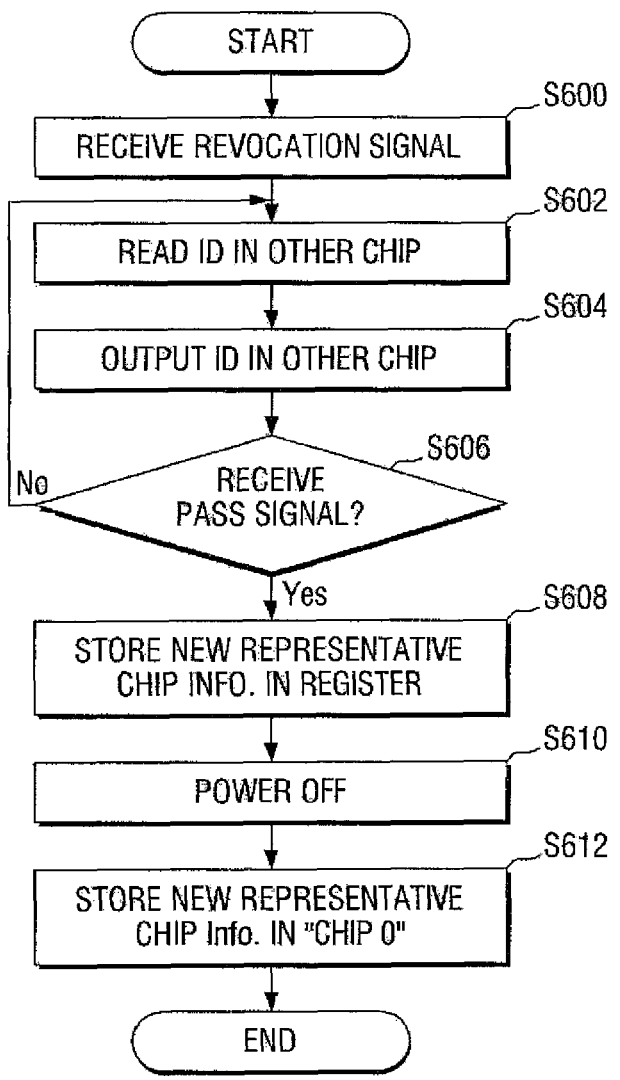

Referring to FIG. 19, a memory device is provided. The memory device includes a plurality of memory chips including at least one memory chip that stores the authentication information, and a register that stores information indicating the memory chip that stores valid authentication information. Referring to FIG. 19, it is assumed that the memory device includes at least two memory chips that store authentication information. In addition, the host device connected to the memory device requests the memory device to provide authentication information, and receives the authentication information stored in one of the memory chip that stores the authentication information from the memory device.

If the authentication information has already been revoked, the memory device may receive a signal notifying the memory device that the authentication information has been revoked from the host device. This signal is referred to as a revocation signal (S600).

The memory device reads the authentication information from a memory chip among the plurality of memory chips, other than the memory chip that stores the revoked authentication information (S602). The read authentication information is output to the host device (S604). Then, the authentication information in the other memory chip is read (S602), and output (S604). The reading and outputting of the authentication information is performed until a notification signal notifying that the memory device has been successfully authenticated, e.g., a pass signal, has been received (S606).

According to an exemplary embodiment, after receiving the pass signal, the memory device may store the information indicating a memory chip that stores successful authentication information, e.g., the information indicating a new representative memory chip, in the register (S608).

According to an exemplary embodiment, after reading authentication information (S602), the memory device may immediately store information indicating the memory chip that stores the read authentication information in the register.

If a power-off notification signal is received from the host device (S610), the memory device may store the information stored in the register, e.g., the information indicating the new representative memory chip, in the previously assigned information retaining memory chip, e.g., CHIP 0 (S612). The information retaining memory chip is one memory chip previously assigned among the plurality of memory chips included in the memory device, and the information indicating the new representative memory chip, stored in the information retaining memory chip, is loaded to the register when power of the memory device is on and initialized.

In the authentication method of a memory device according to an exemplary embodiment, in order to output the authentication information of the memory device, the information stored in the register can be indexed. Thus, it is not necessary to individually check the plurality of memory chips in search of the memory chip that stores valid authentication information among the plurality of memory chips.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A memory device, comprising:
   a plurality of memory chips included in the memory device, wherein at least one memory chip of the plurality of memory chips is configured to store authentication information and one or more of the plurality of memory chips is a memory chip that is not configured to store the authentication information, wherein the at least one memory chip that stores valid authentication information is designated as a representative memory chip; and
   a controller included in the memory device and comprising a first register configured to store information indicating the representative memory chip from among the one or more memory chips and a second register configured to store revoked authentication information,
   wherein the memory device is authenticated using the valid authentication information read from the representative memory chip.

2. The memory device of claim 1, wherein the valid authentication information stored in the representative memory chip comprises information used to authenticate the memory device.

3. The memory device of claim 1, wherein the authentication information comprises a unique ID of a memory chip of the one or more memory chips configured to store the authentication information that is currently storing the authentication information.

4. The memory device of claim 3, wherein the authentication information cannot be changed or deleted subsequent to the authentication information being initially programmed.

5. The memory device of claim 3, wherein the memory chip of the one or more memory chips comprises:
   a first region configured to store the authentication information; and
   a second region configured to store encrypted authentication information corresponding to the authentication information,
   wherein the authentication information stored in the first region is not accessible to a host device connected to the memory device, and
   the memory device is configured to output the encrypted authentication information in response to an authentication information read command received from the host device via the controller.

6. The memory device of claim 1, wherein the controller is configured to transmit the authentication information read command to the representative memory chip, receive the authentication information from the representative memory chip, and transmit the authentication information received from the representative memory chip to the host device.

7. The memory device of claim 6, wherein the controller is configured to transmit a request to the host device to determine validity of the authentication information stored in a memory chip from among the memory chips configured to store the authentication information other than the representative memory chip, to determine a new representative memory chip storing the valid authentication information, and to store information indicating the new representative memory chip in the first register, upon receiving a response from the host indicating that the authentication information provided to the host device is revoked.

8. The memory device of claim 6, wherein the controller is configured to prevent input or output of secure data to or from the representative memory chip upon receiving a response from the host indicating that the authentication information provided to the host device is revoked.

9. The memory device of claim 1, wherein the controller is configured to store information indicating the representative memory chip stored in the first register in an information retaining memory chip upon powering off the memory device, and load the information indicating the representative memory chip from the information retaining memory chip to the first register upon powering on the memory device, wherein the information retaining memory chip is a memory chip previously assigned among the plurality of memory chips.

10. The memory device of claim 1, wherein the controller is configured to prevent input or output of secure data upon receiving a request to input or output the secure data indicated by the revoked authentication information stored in the second register.

11. An authentication system, comprising:
a host device, comprising:
an authentication unit configured to store a revoked authentication information list; and
a memory device, comprising:
a plurality of memory chips included in the memory device, wherein at least one memory chip of the plurality of memory chips is configured to store authentication information and one or more of the plurality of memory chips is a memory chip that is not configured to store the authentication information, wherein the at least one memory chip that stores valid authentication information is designated as a representative memory chip; and
a controller included in the memory device and comprising a first register configured to store information indicating the representative memory chip from among the one or more memory chips and a second register configured to store information indicating at least one memory chip from among the one or more memory chips that stores revoked authentication information,
wherein the at least one memory chip that stores the revoked authentication information is indicated by the revoked authentication information list, and the memory device is authenticated using the valid authentication information read from the representative memory chip.

12. The authentication system of claim 11, wherein the host device further comprises an interface unit configured to permit data transmission and reception between the host device and the memory device.

13. The authentication system of claim 12, wherein the authentication unit is configured to authenticate the memory device using data received from the memory device via the interface unit.

14. The authentication system of claim 11, wherein the authentication information comprises a unique ID of a memory chip of the at least one memory chip configured to store the authentication information that is currently storing the authentication information.

15. An authentication method of a memory device, comprising:
loading information indicating a representative memory chip into a first register included in the memory device while the memory device is powered on, wherein the memory device comprises a plurality of memory chips included in the memory device, at least one of the plurality of the memory chips store authentication information, at least one of the plurality of memory chips does not store the authentication information, and the at least one of the plurality of memory chips that stores valid authentication information is designated as the representative memory chin;
reading the authentication information stored in the representative memory chip indicated by the information stored in the first register, wherein a second register is configured to store revoked authentication information; and
authenticating the memory device using the valid authentication information read from the representative memory chip.

16. The authentication method of claim 15, wherein authenticating the memory device further comprises:
re-authenticating the memory device using authentication information stored in a memory chip other than the representative memory chip upon determining that the read authentication information has been revoked; and
storing, in the register, information indicating the memory chip other than the representative memory chip upon successfully re-authenticating the memory device.

17. The authentication method of claim 15, further comprising turning off power of the memory device subsequent to storing the information stored in the register in an information retaining memory chip.

* * * * *